US008734762B2

(12) United States Patent
Chung et al.

(10) Patent No.: US 8,734,762 B2
(45) Date of Patent: May 27, 2014

(54) PERFLUOROCARBON NANO-EMULSION CONTAINING QUANTUM DOT NANOPARTICLES AND METHOD FOR PREPARING THE SAME

(75) Inventors: Bong Hyun Chung, Daejeon (KR); Yong Taik Lim, Daejeon (KR); Bang Sil Choi, Jeollabuk-do (KR); Jung Hyun Han, Chungcheongnam-do (KR)

(73) Assignee: Korea Research Institute of Bioscience and Biotechnology, Daejeon (KR)

( * ) Notice: Subject to any disclaimer, the term of this patent is extended or adjusted under 35 U.S.C. 154(b) by 815 days.

(21) Appl. No.: 12/738,394

(22) PCT Filed: Aug. 20, 2008

(86) PCT No.: PCT/KR2008/004821
§ 371 (c)(1),
(2), (4) Date: Apr. 16, 2010

(87) PCT Pub. No.: WO2009/051337
PCT Pub. Date: Apr. 23, 2009

(65) Prior Publication Data
US 2010/0233094 A1     Sep. 16, 2010

(30) Foreign Application Priority Data
Oct. 18, 2007  (KR) .................. 10-2007-0105083

(51) Int. Cl.
*A61B 5/00* (2006.01)
*A61B 8/00* (2006.01)
*A61K 9/66* (2006.01)

(52) U.S. Cl.
USPC ........... 424/9.6; 424/9.5; 424/9.51; 424/9.52; 424/455; 977/774; 514/937; 514/938

(58) Field of Classification Search
USPC .......... 424/9.6, 9.5, 9.51, 9.52, 455; 977/774; 514/937, 938
See application file for complete search history.

(56) References Cited

U.S. PATENT DOCUMENTS

| 5,746,999 A | 5/1998 | Gries et al. |
| 5,958,371 A * | 9/1999 | Lanza et al. ................. 424/1.21 |
| 6,638,494 B1 | 10/2003 | Pilgrimm |
| 2006/0003465 A1 * | 1/2006 | Zhukov et al. ............... 436/524 |
| 2007/0253910 A1 * | 11/2007 | Ahrens et al. ................ 424/9.34 |

FOREIGN PATENT DOCUMENTS

| KR | 100541282 B1 | 12/2005 |
| KR | 20070029030 A | 3/2007 |
| KR | 20070058358 A | 6/2007 |

OTHER PUBLICATIONS

Fernandez, C. et al., Chem. Eur. J., 2007, 13, p. 5838-5844.*
Krafft, Marie Pierre, "Fluorocarbons and fluorinated amphiphiles in drug delivery and biomedical research", Advanced Drug Deliver Reviews, 47:209-228 (2001).
Lanza, Gregory M., et al., "1H/19F Magnetic Resonance Molecular Imaging with Perfluorocarbon Nanoparticles", Current Topics in Developmental Biology, 70:57-76 (2005).

* cited by examiner

*Primary Examiner* — Michael G Hartley
*Assistant Examiner* — Leah Schlientz
(74) *Attorney, Agent, or Firm* — Tristan A. Fuierer; Moore & Van Allen, PLLC

(57) ABSTRACT

The present invention relates to a perfluorocarbon nanoemulsion containing quantum dot nanoparticles and a method for preparing the same, more specifically, relates to a method for preparing a multifunctional perfluorocarbon nanoemulsion which simultaneously shows the fluorine-based magnetic resonance properties of perfluorocarbon and the optical properties of quantum dot nanoparticles, the method comprising dispersing quantum dot nanoparticles, modified with a fluorine end group, in perfluorocarbon, and then adding an aqueous emulsifier solution containing lipid to the dispersion. The disclosed perfluorocarbon nanoemulsion containing quantum dot nanoparticles has excellent biocompatibility and simultaneously shows optical properties and magnetic resonance properties, and thus can be used as a contrast agent for multi-mode molecular imaging. Accordingly, the nanoemulsion can be used to study cell and small-animal molecular imaging in various fields, including biological and medical fields.

12 Claims, 4 Drawing Sheets

Zeta Potentia: -22.23(mV)

US 8,734,762 B2

PERFLUOROCARBON NANO-EMULSION CONTAINING QUANTUM DOT NANOPARTICLES AND METHOD FOR PREPARING THE SAME

CROSS-REFERENCE TO RELATED APPLICATIONS

This application is filed under the provisions of 35 U.S.C. §371 and claims the priority of International Patent Application No. PCT/KR2008/004821 filed on 20 Aug. 2008 entitled "Perfluorocarbon Nano-emulsion Containing Quantum Dot Nanoparticles and Method for Preparing the Same" in the name of Bong Hyun CHUNG, et al., which claims priority to Korean Patent Application No. 10-2007-0105083 filed on 18 Oct. 2007, both of which are hereby incorporated by reference herein in their entirety.

TECHNICAL FIELD

The present invention relates to a perfluorocarbon nanoemulsion containing quantum dot nanoparticles and a method for preparing the same, and more particularly to a method for preparing a multifunctional perfluorocarbon nanoemulsion which simultaneously shows the fluorine-based magnetic resonance properties of perfluorocarbon and the optical properties of quantum dot nanoparticles, the method comprising dispersing quantum dot nanoparticles modified with a fluorine end group in perfluorocarbon, and then adding an aqueous emulsifier solution containing lipid to the dispersion.

BACKGROUND ART

Molecular imaging collectively refers to a number of techniques that enable researchers to observe genes, proteins, and other molecules performing a variety of functions in the body, and they have rapidly progressed, thanks to advances in cell biology, biochemical materials, and computer analysis. Unlike X-ray, ultrasound, and other conventional techniques which give doctors only such anatomical clues as the size of a tumor, molecular imaging could help tackle the underlying causes of disease, because it shows the motion of tumors at the molecular level. It has been reported that such molecular imaging techniques will substitute for breast X-ray examination, tissue biopsy and other biopsies in the future.

Many studies on magnetic nanoparticles as contrast agents for use in molecular imaging technology have been conducted. Korean Patent Registration 541282 discloses a technique capable of specifically recognizing liver cells using superparamagnetic iron oxide nanoparticles as liver contrast agents. U.S. Pat. No. 6,638,494 discloses paramagnetic nanoparticles containing a metal such as iron oxide, U.S. Pat. No. 5,746,999 discloses coating silica on the surface of paramagnetic nanoparticles containing a metal such as iron oxide, complexing the nanoparticles with dextran, and applying the resulting nanoparticles in in vivo magnetic resonance imaging, and Korean Patent Publication 2007-0058358 discloses a magnetic resonance imaging agent containing magnetic manganese oxide nanoparticles.

Various attempts to apply such magnetic particles in the medical and pharmaceutical field have been continued, and the results of such research have been applied in industrial practice. However, there is a problem in that it is not easy to apply such magnetic particles to in vitro studies such as cell studies, because an external strong magnetic field must be used in order to use magnetic properties.

Recently, a patent application relating to magnetic nanoparticles, which have optical properties and magnetic properties simultaneously and are covered with a silica shell, was filed (Korean Patent Publication 2007-0029030). However, in said patent application, fluorescent materials exhibiting optical properties are limited to organic fluorescent materials, and magnetic nanoparticles, which can be finally obtained, are also limited to water-soluble magnetic nanoparticles. In addition, there is a technical problem in that the silica shell must be surface-modified in a separate process in order to contain the organic fluorescent materials.

Meanwhile, as contrast agents for use in such molecular imaging technology, complex agents containing perfluorocarbon have recently been widely used. This is because it is known that perfluorocarbon (hereinafter referred to as PFC) does not cause carcinogenesis, mutation and teratogenesis, has low viscosity, excellent emulsifying properties, high gas solubility, lubricating properties, magnetic susceptibility close to that of water, shows non-immune responses and is physiologically inactive and biocompatible. Particularly, perfluorocarbon has been studied for the purpose of delivering bioactive materials to local sites and for therapeutic purposes (Gregory, M. et al., *Current Topics in Developmental Biology*, 70:57, 2005; Krafft, M. P., *Advanced Drug Delivery Reviews*, 47:209, 2001).

Accordingly, there is an urgent need to develop particles which have fluorescent properties observable and measurable in vitro and, at the same time, are also applicable in vivo. However, the results of studies on such particles are still insufficient.

Accordingly, the present inventors have made extensive efforts to solve the problems occurring in the prior art and, as a result, have found that a multifunctional perfluorocarbon nanoemulsion, which can simultaneously perform magnetic resonance imaging (MRI) and optical imaging (OI), can be prepared by dispersing quantum dot nanoparticles modified with a fluorine end group in perfluorocarbon and then adding an aqueous emulsifier solution containing lipid to the dispersion, thereby completing the present invention.

SUMMARY OF INVENTION

It is an object of the present invention to provide a perfluorocarbon nanoemulsion containing quantum dot nanoparticles and a method for preparing the same.

Another object of the present invention is to provide a contrast agent containing said perfluorocarbon nanoemulsion.

To achieve the above objects, the present invention provides a method for preparing a perfluorocarbon nanoemulsion containing quantum dot nanoparticles, the method comprising the steps of: (a) preparing quantum dot nanoparticles having a fluorine end group by surface-modifying quantum dot nanoparticles synthesized from hydrocarbon with a first perfluorocarbon; (b) preparing a dispersion by dispersing the modified quantum dot nanoparticles having a fluorine end group in a second perfluorocarbon; and (c) preparing an nanoemulsion containing quantum dot nanoparticles by adding an aqueous emulsifier solution containing lipid to the dispersion, and then mixing it.

The present invention also provides a perfluorocarbon nanoemulsion prepared by said method, which contains quantum dot nanoparticles, and shows fluorescent properties and magnetic properties simultaneously.

The present invention also provides a contrast agent containing said perfluorocarbon nanoemulsion.

Other features and aspects of the present invention will be apparent from the following detailed description and the appended claims.

BRIEF DESCRIPTION OF DRAWINGS

In FIG. 6, (a): a $^{19}$F MRI image of the side of a sample in an NMR tube; and (b): a $^{19}$F MRI image of the cross-section of the sample.

DETAILED DESCRIPTION OF THE INVENTION AND PREFERRED EMBODIMENTS

Figure 1:
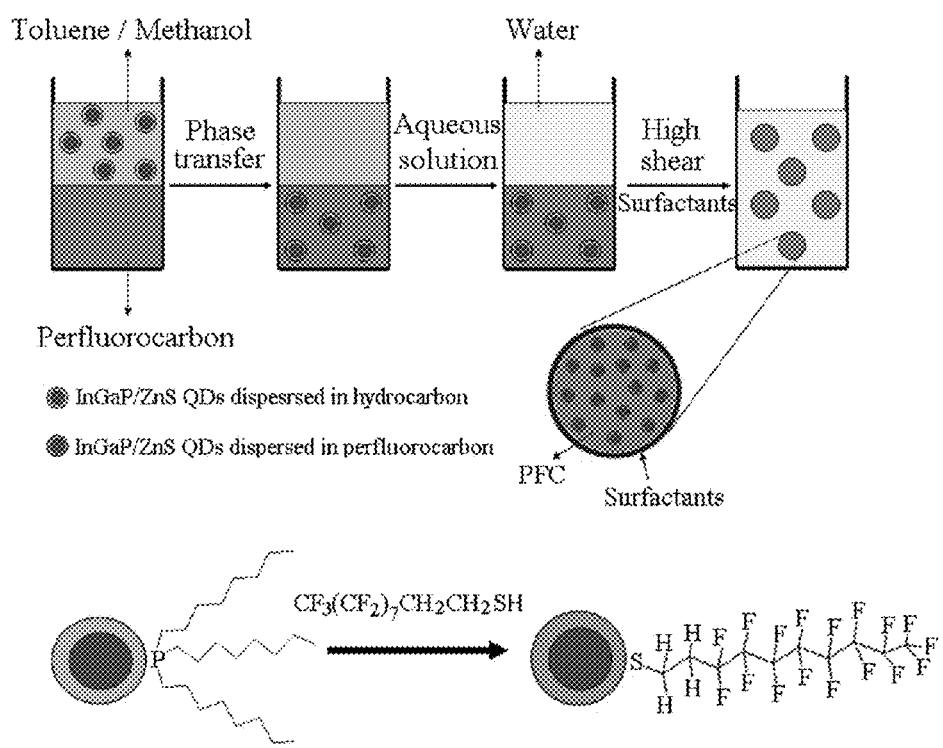
FIG. 1 shows a method for preparing a perfluorocarbon nanoemulsion containing quantum dot nanoparticles according to the present invention.

In one aspect, the present invention relates to a method for preparing a perfluorocarbon nanoemulsion containing quantum dot nanoparticles, the method comprising the steps of: (a) preparing quantum dot nanoparticles having a fluorine end group by surface-modifying quantum dot nanoparticles synthesized from hydrocarbon with a first perfluorocarbon; (b) preparing a dispersion by dispersing the modified quantum dot nanoparticles having a fluorine end group in a second perfluorocarbon; and (c) preparing an nanoemulsion containing quantum dot nanoparticles by adding an aqueous emulsifier solution containing lipid to the dispersion, and then mixing it.

Typical examples of nanoparticles with optical properties are quantum dots. The quantum dots consist of cores made of group II-IV or III-V nanosized semiconductor particles (CdSe, CdTe, CdS, etc.) having about 2-10 nm and shells made of mainly ZnS, etc. Such quantum nanoparticles can exhibit fluorescence at various wavelengths, because the fluorescent wavelength thereof varies depending on the particle size thereof, even though they are made of the same material. In addition, such quantum dots can exhibit strong fluorescence, because they have fluorescence coefficient, which is 100-1000-fold higher than those of general dyes, and they also have good quantum efficiency. Because of such advantages, such quantum dots are currently being studied in various fields, including medical, biological, material and chemical fields. In addition, they are also applied to molecular targeted imaging techniques after synthesizing or modifying the surface thereof so as to make the surface hydrophilic or hydrophobic or introducing therein functional groups capable of binding specifically to specific molecules.

In the present invention, the quantum dot nanoparticles are preferably made of a material selected from the group consisting of CdSe, CdSe/ZnS, CdTe/CdS, CdTe/CdTe, ZnSe/ZnS, ZnTe/ZnSe, PbSe, PbS InAs, InP, InGaP, InGaP/ZnS and HgTe, which are group II-VI or III-V compounds. Also, the quantum dot nanoparticles preferably have a single-core or core/shell structure.

The quantum dot nanoparticles according to the present invention can be prepared using two methods: a lithographic method that uses an optical source such as a laser, and a chemical synthesis method. In the chemical synthesis method, the quantum dot nanoparticles can be prepared by pyrolyzing compounds containing quantum dot nanoparticles at high temperature, such that the surface thereof is coated with various hydrocarbons.

In the present invention, the hydrocarbons are preferably selected from the group consisting of, but not limited to, trialkylphosphine ($C_1$~$C_{10}$), trialkylphosphine oxide ($C_1$~$C_{10}$) and a mixture thereof.

In the present invention, the first perfluorocarbon that is used for the surface modification of the quantum nanoparticles is selected from perfluorohydrocarbons or amphiphilic fluorinated hydrocarbons, which have thiol, phosphine or phosphine oxide end groups. Preferably, the first perfluorocarbon is selected from the group consisting of, but not limited to, perfluorinated alcohol phosphate esters and their salts, perfluorinated sulfonamide alcohol phosphate esters and their salts, perfluorinated alkyl sulfonamide alkylene quaternary ammonium salts, N,N-(carboxyl-substituted lower alkyl) perfluorinated alkyl sulfonamides, and mixtures thereof. As used herein, the term "perfluorinated" refers to surfactants containing at least one perfluorinated alkyl group.

In the present invention, preferred perfluorinated alcohol phosphate esters may include the free acids of the diethanolamine salts of mono- and bis(1H, 1H, 2H, 2H-perfluoroalkyl)phosphates, and preferred perfluorinated sulfonamide alcohol phosphate esters are selected from the group consisting of perfluoro-n-octyl-N-ethylsulfonamidoethyl phosphate, bis(perfluoro-n-octyl-N-ethylsulfonamidoethyl) phosphate, ammonium salt of bis(perfluoro-n-octyl-N-ethylsulfonamidoethyl, bis(perfluorodecyl-N-ethylsulfonamidoethyl)phosphate and bis(perfluorohexy-N-ethylsulfonamidoethyl) phosphate.

In the present invention, the second perfluorocarbon that is used to disperse the modified quantum dot nanoparticles is selected from compounds containing at least one fluorine (F) group in the main chain. Preferably, it is selected from the group consisting of perfluorotributylamine (FC47), perfluorodecalin (PP5), perfluoromethyldecalin (PP9), perfluorooctylbromide, perfluorotetrahydrofuran (FC80), perfluoro butanediol diisopropylether (PBDI), $(CF_3)_2CFOCF_2(CF_2)_2CF_2OCF(CF_3)_2$, perfluoro octanediol diisopropylether (PODI), $(CF_3)_2CFOCF_2(CF_2)_6CF_2OCF(CF_3)_2$, perfluoroetherpolymer, Fomblin Y/01, perfluorododecane, perfluorobicyclo[4.3.0]nonane, perfluorotritrimethylbicyclohexane, perfluorotripropylamine, perfluoroisopropylcyclohexane, perfluoroendotetrahydrodicyclopentadiene, perfluoroadamantane, perfluoroexotetrahydrodicyclopentadiene, perfluorobicyclo[5.3.0]decane, perfluorotetramethylcyclohexane, perfluoro-1-methyl-4-isopropylcyclohexane, perfluoro-n-butylcyclohexane, perfluorodimethylbicyclo[3.3.1]nonane, perfluoro-1-methyl adamantane, perfluoro-1-methyl-4-t-butylcyclohexane, perfluorodecahydroacenapthane, perfluorotrimethybicyclo[3.3.1]nonane, perfluoro-1-methyl admanatane, perfluoro-1-methyl-4-t-butylcyclohexane, perfluorodecahydroacenaphthene, perfluorotrimethybicyclo[3.3.1]nonane, perfluoro-nundecane, perfluorotetradecahydrophenanthrene, perfluoro-1,3,5,7-tetramethyladamantane, perfluorododecahydrofluorene, perfluoro-1-3-dimethyladamantane, perfluoro-n-octylcyclohexane, perfluoro-7-methyl bicyclo[4.3.0]nonane, perfluoro-p-diisopropylcyclohexane, perfluoro-m-diisopropylcyclohexane, perfluoro-4-methyloctahydroquinolidizine, perfluoro-N-methyldecahydroquinoline, F-methyl-1-oxadecalin, perfluorooctahydroquinolidizine, perfluoro 5,6-dihydro-5-decene, perfluoro-4,5-dihydro-4-octene, perfluorodichlorooctane, perfluorobischlorobutyl ether, perfluorooctane, perfluorodichlorooctane, perfluoro-n-octyl bromide, perfluoroheptane, perfluorodecane, perfluorocyclohexane, perfluoromorpholine, perfluorotripropylamine, perfluorotributylamine, perfluorodimethylcyclohexane, perfluorotrimethylcyclohexane, perfluorodicyclohexyl ether, perfluoro-n-butyltetrahydrofuran, and a mixture thereof.

In the present invention, the lipid/surfactant is used to coat perfluorocarbon containing quantum nanoparticles so as to form an outer coating may contain coupled ligand or entrap reagents for binding desired components to the surface.

In the present invention, the lipid is preferably selected from the group consisting of, but not limited to, natural or synthetic phospholipids, fatty acids, cholesterols, lysolipids, sphingomyelins, tocopherols, glucolipids, stearylarginines, cardiolipins, plasmalogens, a lipid with ether or ester linked fatty acids, polymerized lipids, and a mixture thereof.

In the present invention, when the lipid along with an aqueous emulsifier solution is added to the quantum dot nanoparticle-containing perfluorocarbon (PFC/QD) dispersed in the second perfluorocarbon, it can coat the outer surface of the quantum dot nanoparticle-containing perfluorocarbon (PFC/QD) and, in addition, allows the outer surface of the quantum dot nanoparticle-containing perfluorocarbon (PFC/QD) to entrap aptamers, nucleic acids, etc.

Cationic lipids usable in the present invention include DOTMA, N-[1-(2,3-dioleoyloxy)propyl]-N,N,N-trimethylammonium chloride, DOTAP, 1,2-dioleoyloxy-3-(trimethylammonio)propane, DOTB, 1,2-dioleoyl-3-(4'-trimethyl-ammonio)butanoyl-sn-glycerol, 1,2-diacyl-3-trimethylammonium-propane, DAP, 1,2-diacyl-3-dimethylammonium-propane, TAP, 1,2-diacyl-3-trimethylammonium-propane, 1,2-diacyl-sn-glycerol-3-ethyl phosphocholine, 3β-[N',N'-dimethylaminoethane)-carbamolcholestrol-HCl, DC-cholesterol (DC-Chol), dimethyldioctadecylammonium bromide (DDAB) and the like.

Similar to cationic lipids as described above, lipids bearing cationic polymers such as polylysine or polyarginine can bind to negatively charged biomolecules on the surface of emulsion particles.

The emulsifier which is used in the present invention may be selected from the group consisting of PVA, nonionic surfactants, cationic surfactants, anionic surfactants, amphoteric surfactants. In addition, Pluronic F-68, Hamposyl™ L30, sodium dodecyl sulfate, Aerosol 413, Aerosol 200, Lipoproteol™ LCO, Standapol™ LCO, Standapol™ SH 135, Fizul™ 10-127, Cyclopol™ SBFA 30, Deriphat™ 170, Lonzaine™ JS, Niranol™ C2N-SF, Amphoterge™ W2, Amphoterge™ 2WAS, Pluronic™ F-68, Pluronic™ F-127, Brij™ 35, Triton™ X-100, Brij™ 52, Span™ 20, Generol™ 122 ES, Triton™ N-42, Triton™ N-101, Triton™ X-405, Tween™ 80, Tween™ 85, Brij™ 56 and the like, which are commercially available, may also be used.

As shown in FIG. 1, a method for preparing a perfluorocarbon emulsion containing quantum dot nanoparticles according to the present invention comprises surface-modifying quantum dot nanoparticles, synthesized from hydrocarbons, with a first perfluorocarbon, to prepare quantum dot nanoparticles having a fluorine end group, and dispersing the quantum dot nanoparticles, modified with the fluorine end group, in a second perfluorocarbon, to prepare a dispersion, then the dispersion is dispersed in an aqueous emulsifier solution containing lipid to form droplets in the aqueous emulsifier solution. In order for the perfluorocarbon having the quantum dot nanoparticles dispersed therein to be dispersed in the aqueous emulsifier solution, ultrasonic waves, homogenizers or the like may be used.

In the present invention, the lipid may be mixed with the emulsifier in an amount of 0-50 parts by weight based on 100 parts by weight of the emulsifier and functions to enhance the stability of the emulsifier covering the outer layer of the perfluorocarbon.

In another aspect, the present invention relates to a perfluorocarbon nanoemulsion containing quantum dot nanoparticles, which shows fluorescent properties and magnetic properties simultaneously; and a contrast agent containing said perfluorocarbon nanoemulsion.

The perfluorocarbon nanoemulsion containing quantum dot nanoparticles prepared according to the present invention is a multifunctional emulsion which simultaneously shows fluorescent properties and fluorine-based magnetic resonance properties. The perfluorocarbon nanoemulsion according to the present invention can be used as contrast agents for magnetic resonance imaging and optical imaging.

EXAMPLES

Hereinafter, the present invention will be described in further detail with reference to examples. It will be obvious to those skilled in the art that these examples are illustrative purpose only and are not to be construed to limit the scope of the present invention, because these examples can be modified into other various forms.

Example 1

Figure 2:
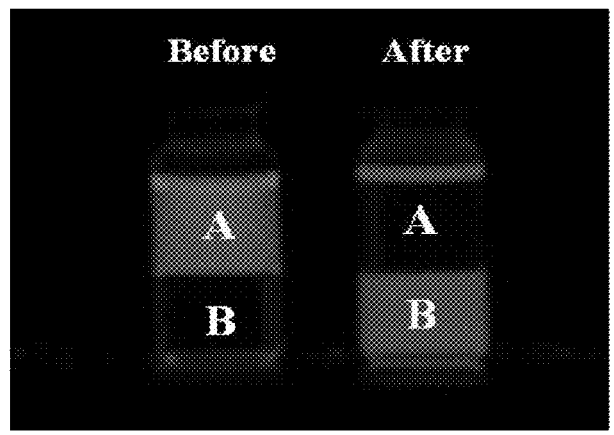
FIG. 2 shows that quantum dot nanoparticles (A) dispersed in toluene and methanol were modified, and then phase transferred to perfluorocarbon (B).

Preparation of Perfluorocarbon Nanoemulsion Containing Quantum Dot Nanoparticles 1-1: Surface Modification of Quantum Dot Nanoparticles with Perfluorocarbon 50 µl of quantum dots (CdSe/ZnS [520 nm], InGaP/ZnS [670 nm]; 1.4 mg/ml in toluene; Evident Tech Co., USA) was added to methanol to a total volume of 8 ml. To the mixture, 0.5 ml of 1H,1H,2H,2H-perfluorodecanethiol (Aldrich, USA) was added slowly dropwise, and then 4 ml of perfluorotributylamine (Aldrich, USA) was added thereto to separate the solution into layers. The solution, which has been separated into layers, was strongly stirred such that, as shown in FIG. 2, the quantum dot nanoparticles modified with 1H,1H,2H,2H-perfluorodecanethiol were completely moved from the toluene/methanol layer to the perfluorotributylamine layer. Then, the upper layer (toluene/methanol layer) was decanted, and an excess amount of methanol was added to and mixed with the remaining material to remove unreacted 1H,1H,2H,2H-perfluorodecanethiol. This procedure was repeated three times.

1-2: Preparation of Aqueous Emulsion Solution 64 mol % of lecithin (Sigma Chemical Co. USA), 35 mol % of cholesterol (Sigma Chemical Co., USA) and 1 mol % of DPPE-PEG 2000 (Avanti Polar Lipids Inc., Alabaster, Ala., USA) were dissolved in 5 ml of chloroform. The mixture solution was subjected to reduced pressure to evaporate chloroform, and the composite from which chloroform has been evaporated was dried in a vacuum oven at 50° C. for one day to form a thin lipid film. The film was added to sterilized triple distilled water, and then dispersed in the water by ultrasonic waves, thus preparing a liposome suspension.

1-3: Preparation of Perfluorocarbon Nanoemulsion Containing Quantum Dot Nanoparticles 40% v/v of the perfluorocarbon containing quantum dot nanoparticles (PFC/QD) prepared in Example 1-1, 2.0% w/v of the aqueous emulsion solution prepared in Example 1-2 and 1.7% w/v of glycerin (Sigma-Aldrich, USA) were added to sterile distilled water, and then mixed with each other with a homogenizer (PowerGen 1000, Fisher Scientific, USA) for 30 minutes. The mixture was suspended using an emulsifier (model M-110S, Microfluidics Co., USA) at 2000 psi for 4 minutes. Then, the prepared perfluorocarbon nanoemulsion containing quantum dot nanoparticles was placed in a vial and sealed, which was then cold-stored at 4° C.

Example 2

Figure 3:
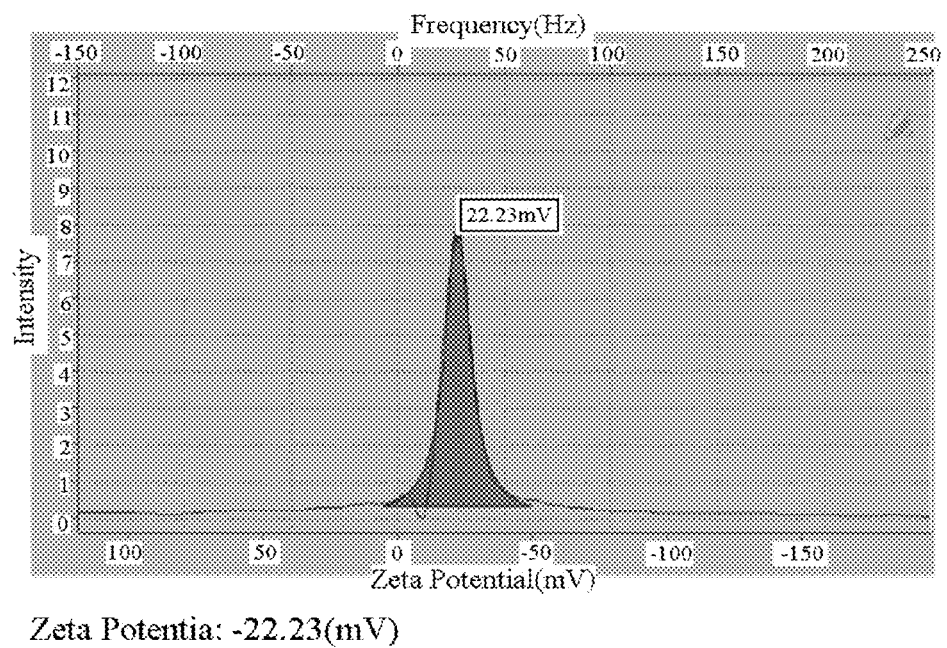
FIG. 3 shows measurement results for the Zeta-potential of a perfluorocarbon nanoemulsion containing quantum dot nanoparticles according to the present invention.

Properties of Perfluorocarbon Nanoemulsion Containing Quantum Dot Nanoparticles 2-1: Measurement of Electrical Properties of Perfluorocarbon Nanoemulsion Containing Quantum Dot Nanoparticles In order to examine the electrical properties of the perfluorocarbon nanoemulsion containing quantum dot nanoparticles prepared in Example 1, the zeta potential of the nanoemulsion was measured using an electrophoretic light scattering apparatus (ELS 8000, Otsuka Electronics Co., JP). As a result, it could be seen that the nanoemulsion had a zeta potential of −22.23 mV (FIG. 3).

Figure 4:
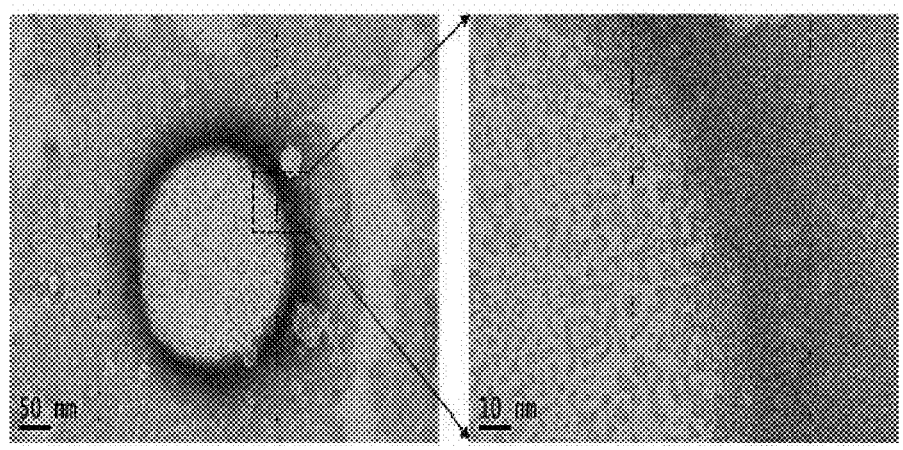
FIG. 4 shows TEM photographs of a perfluorocarbon nanoemulsion containing quantum dot nanoparticles according to the present invention.

2-2: Measurement of Image Properties of Perfluorocarbon Nanoemulsion Containing Quantum Dot Nanoparticles The nanoemulsion prepared in Example 1 was stained with 1% phosphotungstic acid, and then placed on a formvar-coated grid. Then, the morphology of the nanoemulsion was observed using a 200-kV field emission transmission electron microscope (JEM-2100F, Jeol Ltd.). As a result, as can be seen in FIG. 4, the perfluorocarbon nanoemulsion had a diameter of 250-300 nm and a quantum dot nanoparticle had a diameter of 3-10 nm, suggesting that the quantum dots were dispersed in the emulsion.

Figure 5:
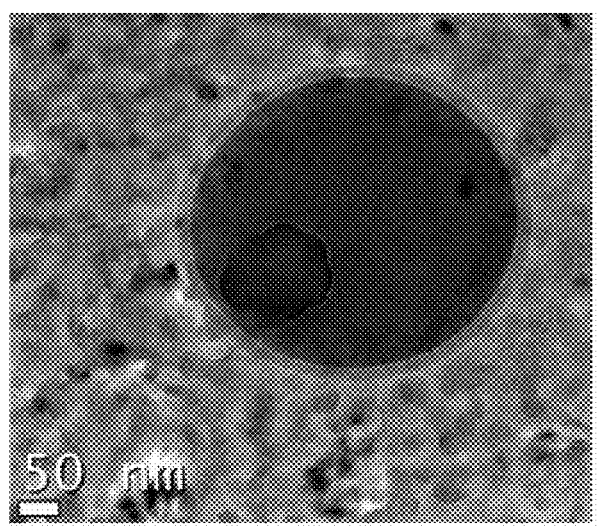
FIG. 5 shows a Cryo-TEM photograph of a perfluorocarbon nanoemulsion containing quantum dot nanoparticles according to the present invention.

Also, the nanoemulsion prepared in Example 1 was formed into a thin film on a carbon-coated grid, and then the grid was immersed in ethanol and stored in liquid nitrogen. The sample frozen in liquid nitrogen as described above was transferred to a GATAN model 630 cryotransfer, and then immediately, the images were acquired with a multiscan 600W CCD camera (Gatan, Inc., Warrendale, Pa.) at 120 kV. As a result, as can be seen in FIG. 5, the lipid and the emulsifier covered the perfluorocarbon emulsion.

Figure 6:
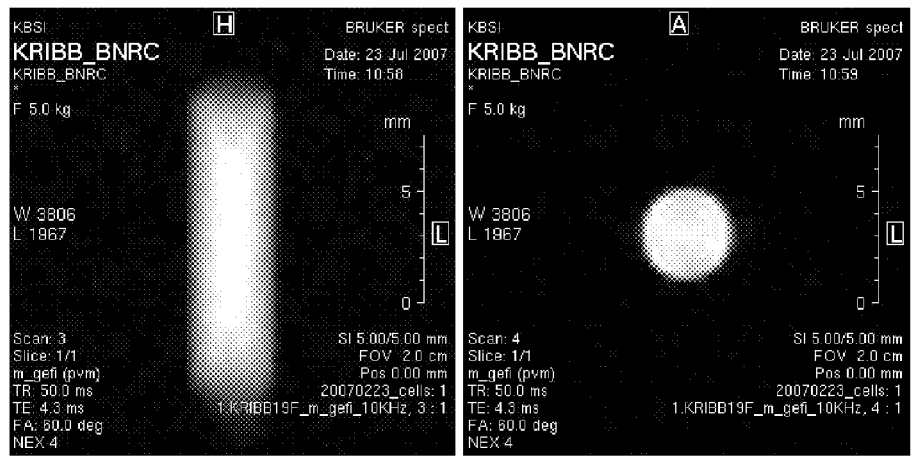
FIG. 6 shows $^{19}$F MRI images of a perfluorocarbon nanoemulsion containing quantum dot nanoparticles according to the present invention.

The nanoemulsion prepared in Example 1 was placed in a U-slide 8-well chamber and observed with an Olympus IX71 inverted fluorescence microscope at 100× magnification, and the fluorescence image thereof was measured with a deltavision RT imaging system equipped with a 425-nm excitation filter (425DF45) and a 655-nm emission filter (655WB20). The $^{19}$F MRI image of the PFC nanoemulsion containing quantum dot nanoparticles was measured with a 4.5 T MRI Scanner (Bruker, Germany). As a result, as shown in FIG. 6, the $^{19}$F MRI image of the perfluorocarbon nanoemulsion containing quantum dot nanoparticles could be obtained.

In conclusion, it could be seen that the perfluorocarbon nanoemulsion containing quantum dot nanoparticles prepared in Example 1 simultaneously showed fluorescent properties and magnetic properties.

INDUSTRIAL APPLICABILITY

As described above, the perfluorocarbon nanoemulsion containing quantum dot nanoparticles according to the present invention has excellent biocompatibility and simultaneously shows optical properties and magnetic resonance properties, and thus can be used as a contrast agent for multimode molecular imaging. Accordingly, it can be used to study cell and small-animal molecular imaging in various fields, including biological and medical fields.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method for preparing a perfluorocarbon nanoemulsion containing quantum dot nanoparticles, the method comprising the steps of:
    (a) modifying the surface of quantum dot nanoparticles with a first perfluorocarbon to form a modified quantum dot nanoparticle, wherein the quantum dot nanoparticles are coated with hydrocarbons, wherein the first perfluorocarbon is selected from perfluorohydrocarbons or amphiphilic fluorinated hydrocarbons, which have thiol, phosphine or phosphine oxide end groups, and wherein the modified quantum dot nanoparticles have a fluorine end group;
    (b) preparing a dispersion by dispersing the modified quantum dot nanoparticles having a fluorine end group in a second perfluorocarbon; and
    (c) preparing an nanoemulsion containing quantum dot nanoparticles by adding an aqueous emulsifier solution containing lipid to the dispersion, and then mixing it.

2. The method for preparing a perfluorocarbon nanoemulsion according to claim 1, wherein said quantum dot nanoparticle is made of group II-IV or group III-V compound.

3. The method for preparing a perfluorocarbon nanoemulsion according to claim 1, wherein said quantum dot nanoparticle is made of a material selected from the group consisting of CdSe, CdSe/ZnS, CdTe/CdS, CdTe, ZnSe/ZnS, ZnTe/ZnSe, PbSe, PbS InAs, InP, InGaP, InGaP/ZnS and HgTe.

4. The method for preparing a perfluorocarbon nanoemulsion according to claim 1, wherein said quantum dot nanoparticle has a single-core or core/shell structure.

5. The method for preparing a perfluorocarbon nanoemulsion according to claim 1, wherein the second perfluorocarbon is selected from compounds containing at least one fluorine (F) group in the main chain.

6. The method for preparing a perfluorocarbon nanoemulsion according to claim 5, wherein the second perfluorocarbon is selected from the group consisting of perfluorotributylamine (FC47), perfluorodecalin (PP5), perfluoromethyldecalin (PP9), perfluorooctylbromide, (perfluorotetrahydrofuran (FC80), perfluoro butanediol diisopropylether (PBDI), $(CF_3)_2CFOCF_2(CF_2)_2CF_2OCF(CF_3)_2$, perfluoro octanediol diisopropylether (PODI), $(CF_3)_2CFOCF_2(CF_2)_6CF_2OCF(CF_3)_2$, perfluoroetherpolymer, Fomblin Y/01, perfluorododecane, perfluorobicyclo[4.3.0]nonane, perfluorotritrimethylbicyclohexane, perfluorotripropylamine, perfluoroisopropylcyclohexane, perfluoroendotetrahydrodicyclopentadiene, perfluoroadamantane, perfluoroexotetrahydrodicyclopentadiene, perfluorobicyclo[5.3.0]decane, perfluorotetramethylcyclohexane, perfluoro-1-methyl-4-isopropylcyclohexane, perfluoro-n-butylcyclohexane, perfluorodimethylbicyclo[3.3.1]nonane, perfluoro-1-methyl adamantane, perfluoro-1-methyl-4-t-butylcyclohexane, perfluorodecahydroacenapthane, perfluorotrimethybicyclo[3.3.1]nonane, perfluoro-1-methyl admanatane, perfluoro-1-methyl-4-t-butylcyclohexane, perfluorodecahydroacenaphthene, perfluorotrimethybicyclo[3.3.1]nonane, perfluoro-nundecane, perfluorotetradecahydrophenanthrene, perfluoro-1,3,5,7-tetramethyladamantane, perfluorododecahydrofluorene, perfluoro-1-3-dimethyladamantane, perfluoro-n-octylcyclohexane, perfluoro-7-methyl bicyclo[4.3.0]nonane, perfluoro-p-diisopropylcyclohexane, perfluoro-m-diisopropylcyclohexane, perfluoro-4-methyloctahydroquinolidizine, perfluoro-N-methyldecahydroquinoline, F-methyl-1-oxadecalin, perfluorooctahydroquinolidizine, perfluoro 5,6-dihydro-5-decene, perfluoro-4,5-dihydro-4-octene, perfluorodichlorooctane, perfluorobischlorobutyl ether, perfluorooctane, perfluorodichlorooctane, perfluoro-n-octyl bromide, perfluoroheptane, perfluorodecane, perfluorocyclohexane, perfluoromorpholine, perfluorotripropylamine, perfluorotributylamine, perfluorodimethylcyclohexane, perfluorotrimethylcyclohexane, perfluorodicyclohexyl ether, perfluoro-n-butyltetrahydrofuran, and a mixture thereof.

7. The method for preparing a perfluorocarbon nanoemulsion according to claim 1, wherein the lipid is selected from the group consisting of natural or synthetic phospholipids, fatty acids, cholesterols, lysolipids, sphingomyelins, tocopherols, glucolipids, stearylarginines, cardiolipins, plasmalogens, a lipid with ether or ester linked fatty acids, polymerized lipids, and a mixture thereof.

8. The method for preparing a perfluorocarbon nanoemulsion according to claim 1, wherein the emulsifier is selected from the group consisting of PVA, nonionic surfactants, cationic surfactants, anionic surfactants, amphoteric surfactants, and mixture thereof.

9. The method for preparing a perfluorocarbon nanoemulsion according to claim 1, wherein said mixing of the step (c) is carried out using homogenizer or sonification.

10. A perfluorocarbon nanoemulsion containing quantum dot nanoparticles, which is prepared by the method of claim 1, and shows fluorescent properties and magnetic properties simultaneously.

11. A contrast agent containing the perfluorocarbon nanoemulsion of claim 10.

12. The method for preparing a perfluorocarbon nanoemulsion according to claim 1, wherein the hydrocarbons are preferably selected from the group consisting of trialkylphosphine ($C_1$-$C_{10}$), trialkylphosphine oxide ($C_1$-$C_{10}$), and a mixture thereof.

\* \* \* \* \*